Sept. 22, 1936.          G. D. KINGSLAND                2,055,033
            TEMPERATURE CONTROL SYSTEM AND APPARATUS
                     Filed May 28, 1934          2 Sheets-Sheet 2

INVENTOR
GEORGE D. KINGSLAND
BY Paul, Paul, Moore
ATTORNEYS

Patented Sept. 22, 1936 2,055,033

UNITED STATES PATENT OFFICE

2,055,033

TEMPERATURE CONTROL SYSTEM AND APPARATUS

George D. Kingsland, Minneapolis, Minn., assignor to Minneapolis-Honeywell Regulator Company, Minneapolis, Minn., a corporation of Delaware Application May 28, 1934, Serial No. 727,989

14 Claims. (Cl. 236—47)

This invention relates in general to control systems and apparatus to be used therein and, more particularly, to temperature control systems for buildings, and fluid-flow controlling valves for use in such systems.

In many types of buildings, such as office buildings, school buildings, etc., it is customary to maintain a relatively high fluid temperature or steam pressure for the radiators during certain periods of time or parts of the day, especially while the building is occupied, and a relatively low fluid temperature or steam pressure during other periods of time or parts of the day, especially at night. The reason for this is that it is necessary to maintain the temperature in the building at approximately 70° F. during the day, while a temperature of 50° F. to 60° F. is entirely satisfactory at night. Since the temperature or pressure of any heated fluid is a measure of the amount of heat or heat-content per unit volume of the fluid, it follows that when the temperature or pressure of a heated fluid is changed the heat-content is also changed. When the radiators are equipped with manually adjusted valves or with fixed orifices, the temperature of the space can be lowered at night and increased to the normal value during the day merely by decreasing the fluid temperature or steam pressure at night. When the radiators are equipped with thermostatically operated valves, however, they are usually equipped with temperature-sensitive elements which respond to the temperature of the space in which the radiators are located. These thermostatic valves are usually of the throttling or modulating type in that the valve assumes various definite positions with respect to the valve seat as the space temperature changes. The position assumed by the valve is independent of the heat-content of the heating fluid passing through the valve to the radiators. As a result, such valves automatically regulate the flow of the heated fluid to the radiators to maintain a constant temperature in the space being heated. When the heat-content of the fluid flowing to the radiators of such a system is lowered at night, the radiators cool and in turn the space cools, and the thermostatic valves then pass more of this low heat-content fluid to the radiators in an attempt to maintain the normal day temperature throughout the night. It therefore becomes necessary for someone to go through the building and manually readjust the control point or temperature setting of the thermostatic valves every time it is desired to change the space temperature.

This invention contemplates the use of saturated steam as the heating fluid whereby changes in pressure cause changes in temperature and heat content in the heating fluid.

One of the objects of this invention is to provide automatic means for changing the control point of thermostatically operated fluid-flow controlling valves when the heat-content of the fluid is changed.

Another object of this invention is to provide means which will eliminate the necessity of manually readjusting a large number of individual thermostatic valves on the radiators of a heating system in order to maintain different space temperatures during different periods of time.

Another object of the invention is to provide means for automatically changing the temperature setting of a plurality of thermostatic valves when the temperature of the fluid passing through the valves is changed.

Another object of this invention is to provide an improved thermostatic valve for a radiator which will maintain a uniform high space temperature in the space being heated by the radiator during the time that a high heat-content fluid is available, and which will automatically maintain a uniform low space temperature during the time that a low heat-content fluid is available.

Other objects and advantages reside in certain novel features of the construction, arrangement, and combination of the parts which will be hereinafter more fully described and particularly pointed out in the appended claims, reference being had to the accompanying drawings forming a part of this specification, and in which:

Figure 1:
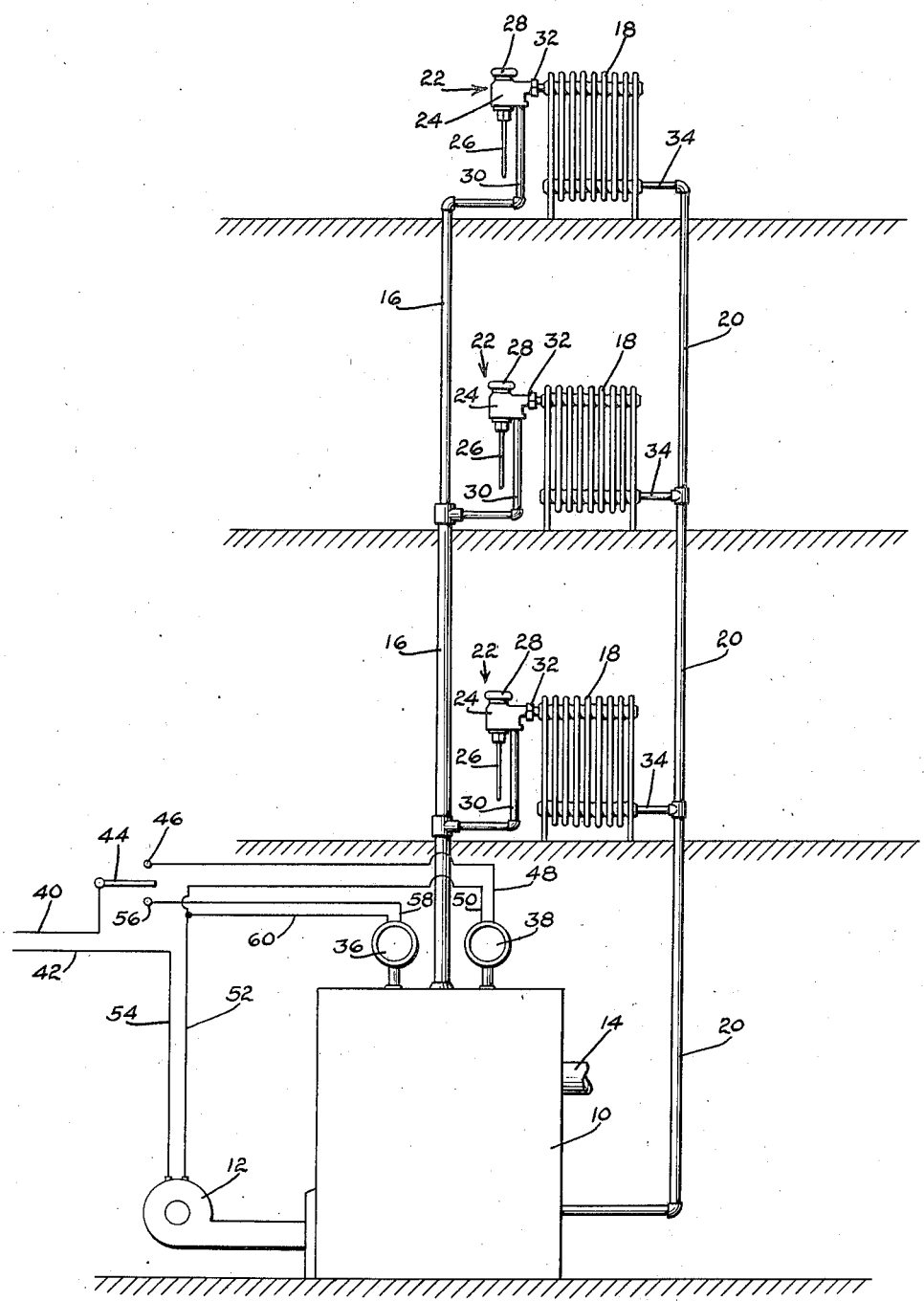
Fig. 1 is a diagrammatic showing of a heating system embodying my improvement.

In Fig. 1 of the drawings, there has been disclosed one form of temperature control system for the purpose of explanation and description. In the specific form shown, there is a heat-generating boiler herein shown as a steam boiler 10 which is equipped with an oil burner 12 and a flue 14. The boiler 10 is equipped with the usual steam riser 16 supplying a group of steam radiators 18. The boiler 10 is also equipped with a condensation return line 20 which connects with radiators 18. The radiators 18 are equipped with valved devices which respond to some physical condition external of the devices, such as the temperature of the air in the space in which the radiators 18 are located, and are herein shown as thermostatic valves 22. The thermostatic valves 22 have a valve body or casing 24, a temperature responsive thermostatic element in the form of a tube 26, and a combination manual control and temperature-setting handle 28. The thermostatic valves 22 are connected to the steam riser 16 by means of pipes 30 and to the radiators 18 by means of unions 32. The radiators 18 are connected to the return line by means of pipes 34. Any number of radiators 18 may be used, and they may be located on different floors of a building as indicated in Fig. 1, or they may all be located on the same floor. Temperature control systems of this general nature are old in the art.

The boiler 10 is equipped with pressure switches 36 and 38, each of which is arranged to control the operation of the oil burner 12 during certain periods of time to maintain a constant steam pressure in the steam riser 16. Power for operating the oil burner 12 is supplied by line wires 40 and 42. The pressure switch 38 is set to maintain a constant steam pressure which is sufficiently high to heat the building during the day. The pressure switch 36 is set to maintain a lower steam pressure which is only sufficient to heat the building at night. The normal day-circuit for the oil burner 12 is as follows: supply line 40, switch 44, terminal 46, line 48, pressure switch 38, line 50, line 52, oil burner 12, line 54, to return line 42. The night-circuit for the oil burner 12 is as follows: supply line 40, switch 44, terminal 56, line 58, pressure switch 36, line 52, oil burner 12, line 54, to return line 42. The circuit for the oil burner 12 passes through the low-pressure switch 36 or the high-pressure switch 38, depending upon the position of the switch 44. The switch 44 may be operated manually to shift the control of the oil burner 12 to the low-pressure switch 36 for night operation, and to shift the control of the oil burner 12 to the high-pressure switch 38 for day operation. This switch 44 may also be operated automatically by any one of the various forms of clocks and time switches well known in the art for this purpose. By this arrangement, a constant relatively high steam pressure is automatically maintained for the radiators 18 as long as the switch 44 is in contact with the terminal 46. If, however, the switch 44 is shifted to contact with terminal 56, the radiators 18 will be supplied with relatively low pressure steam which is maintained at a constant value by the pressure switch 36. Pressure switches such as 36 and 38 are well known in the art.

Figure 2:
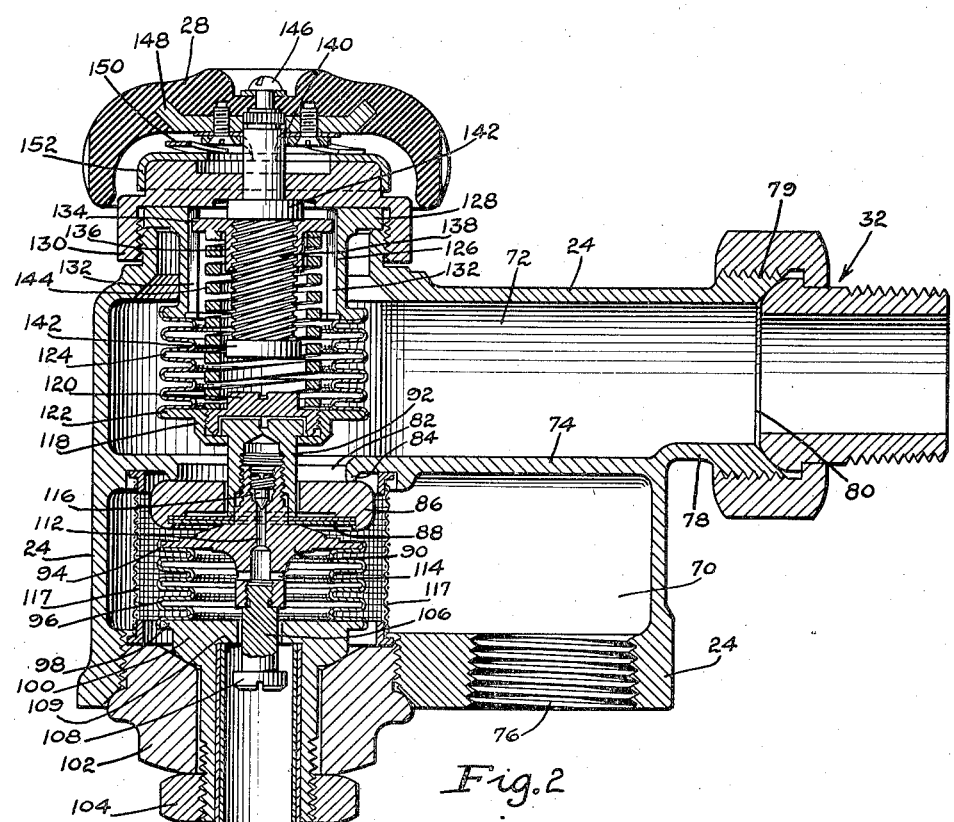
Fig. 2 is a central vertical section through a thermostatic radiator valve incorporating my improvement and adapted to be used in the system shown in Fig. 1.

In Fig. 2 of the drawings, there has been disclosed an improved valved device for use in a system such as that shown in Fig. 1. In the specific form of valved device shown, the valve body or casing 24 of the thermostatic radiator valve 22 (Fig. 1) has a fluid inlet chamber 70 and a fluid outlet chamber 72 separated by a partition 74. The casing 24 may be made of various materials, but is here shown as a metal casting. The casing 24 has a threaded fluid-inlet opening 76 into the chamber 70, and into which may be screwed the fluid supply pipe 30 (Fig. 1). The casing 24 also has a neck portion 78 projecting from the chamber 72 providing a fluid-outlet opening 80 and having external threads 81 to which may be attached an ordinary pipe union 32. This pipe union 32 may be connected to a fluid-outlet pipe or direct to a radiator as shown in Fig. 1. The partition 74 has an opening 82 through which a heating fluid may pass from the inlet chamber 70 to the outlet chamber 72. There is a raised portion or valve seat 84 around the edge of the opening 82 which cooperates with a movable valve 86 to regulate the amount of fluid passing through the opening 82.

The position of this valve 86 is controlled or regulated by three different means, two of which are external, and one internal. Of the external, one is automatically responsive to an external physical condition, and the other is manually operable. The internal is automatically responsive to an internal physical condition and additionally regulates the valve position. The latter will be described first. The valve 86 is supported upon a member which responds to some physical condition, preferably a temperature condition of the passing fluid to regulate additionally the amount of fluid passing through the casing 24. This supporting member is located in the inlet chamber 70 and in contact with the fluid passing through the casing 24 and may take various forms, but is here shown in the form of a thermostatic disc 88 which is preferably made of thermostatic material such as bimetal which is well known in the art. The upper side of the thermostatic disc 88 has the greater coefficient of expansion in order that it may additionally regulate the fluid-flow through the casing 24 directly in accordance with the temperature of the fluid. Upon a decrease in the temperature of the fluid passing through the casing 24, the thermostatic disc 88 tends to move the valve 86 to a more nearly closed position, and vice versa. Since changes in the heat-content of a fluid may be indicated by changes in some physical condition of the fluid such as pressure or temperature, the thermostatic disc 88 which responds to temperature changes varies the flow of fluid directly in accordance with the heat-content of the passing fluid.

The thermostatic disc 88 has an opening through its center to permit it to be slipped over a projection on the upper side of a connecting member 90. The thermostatic disc 88 is then clamped against a shoulder on the connecting member 90 by screwing a nut 92 onto the upper projection of the connecting member 90. The connecting member 90 and the nut 92 actuate the valve 86 through the thermostatic disc 88 to vary the position of the valve 86 with respect to the partition 74 and regulate the flow of a heating fluid through the casing 24. For any position of the connecting member 90 and the nut 92, the thermostatic disc 88 may vary the position of the valve 86 additionally to regulate the flow of fluid through the casing 24. The valve regulation automatically responsive to an external physical condition is here disclosed as a thermostatic mechanism responsive to space temperature. The connecting member 90 and nut 92 are operated thereby. The connecting member 90 has an extended portion in the form of a flange 94 to which the upper end of a bellows 96 is attached, usually by soldering. The lower end of the bellows 96 is attached to a flange 98 of a plug 100, usually by soldering. The lower portion of the plug 100 is threaded to permit it to be tightly secured to a large nut 102 by means of a small nut 104. The large nut 102 is screwed in the casing 24. The plug 100 has a large opening in the bottom with a small opening extending on through to the top. A screw 106 is passed through the small opening of plug 100 and screwed into a projection on the lower side of the connecting member 90. The screw 106 has an enlarged head 108 which cooperates with an internal shoulder 109 of the plug 100 to prevent the bellows 96 from expanding more than a predetermined amount prior to the complete assembly of the instrument. Tube 26 is secured into an opening in the plug 100. The connecting member 90 is equipped with a small vertical opening 112 which cooperates with a small cross opening 114. The bellows 96 and the tube 26 are filled with the proper amount of a volatile fluid through the opening 112 after which the opening 112 is closed by a plug 116 which screws into the upper end of a projection on the connecting member 90. This volatile fluid expands and contracts the bellows 96 upon changes in some physical condition external of the casing 24, such as the temperature of the air surrounding the lower end of tube 26. Inside of the tube 26 there are two additional tubes 110 and 111 which help to separate the heavier part of the volatile fluid in the bottom of the tube 26 from the lighter or rarefied part in the bellows 96. By this arrangement, the expansion and contraction of the bellows 96 and accordingly the position of valve 86 are governed entirely by the temperature of the air surrounding the lower part of tube 26, even though this air temperature may be only about 70° F. and the temperature of the fluid passing through the casing 24 and in contact with the bellows 96 may be considerably above 200° F. This arrangement provides external thermostatic operating means for the connecting member 90 which actuates the valve 86 to vary the amount of heating fluid passing through the casing 24 in accordance with the heat requirements. A little solder is usually added to the plug 116 in order to seal the volatile fluid more perfectly into the bellows 96 and valve 86 to prevent foreign matter from interfering with the operation of the mechanism.

The externally manually operable regulation of the valve 86 will next be described. The upper end of the nut 92 has a shoulder which cooperates with a cup member 118. The member 118 is secured to the nut 92 by a plug 120. The cup member 118 has a flange 122 to which is soldered the lower end of a bellows 124. The upper end of the bellows 124 is soldered to the lower end of a sleeve 126 which has a flange 128 at the top which is clamped to the casing 24 by a nut 130. The sleeve 126 is equipped on the inside with two vertical slots 132 which cooperate with the ears 134 of a nut 136, which prevent the nut 136 from rotating while it is being driven up and down. The inside of the nut 136 is equipped with threads to cooperate with a threaded stud 138 by which the nut 136 is moved up and down. The threaded stud 138 is secured to a pin 140 by means of collars 142. The collars 142 limit the travel of the nut 136. Between the flange 134 of the nut 136 and the plug 120 there is inserted a compression spring 144 which acts against the volatile-filled bellows 96. The upper end of the pin 140 passes through the center of the nut 130 and has a manually operable handle 28 attached thereto by a screw 146. By rotating the handle 28, the nut 136 can be made to move up and down and thus change the compression of spring 144 and thus change the temperature setting of the device. The handle 28 is preferably made of a mounted heat-insulating material having a metal insert 148. The upper end of the pin 140 cooperates with this metal insert 148 to permit the handle 28 to turn the stud 148. A spring member 150 is secured to the metal insert 148 and rests on a cup member 152 which fits over the upper part of the nut 130.

By manually rotating the handle 28, the nut 134 can be made to move up and down and thus change the compression of spring 144 which will accordingly vary the position of valve 86 to regulate the amount of fluid flowing through the casing 24. By rotating the handle 28 in one direction and increasing the compression of spring 124 sufficiently, the valve 86 may be opened for any ordinary space temperature. By rotating the handle 28 in the opposite direction and decreasing the compression of spring 124 sufficiently, the valve 86 will be closed even if the space temperature is relatively low. This arrangement provides external operating means for the nut 92 which actuates the valve 86 and also provides external adjusting means for the volatile-fluid bellows 96. By means of this manually operable handle 28, the valve 86 can be moved to any desired position for a particular temperature of the air surrounding the lower end of tube 26 and for a particular temperature of the fluid passing through the casing 24.

The thermostatic valve 22 which is shown in detail in Fig. 2 is assembled in the following manner: The bellows 96 is soldered to the flange 94 of the connecting member 90 and also to the flange 98 of the plug 100. The screw 106 is then screwed into the connecting member 90. The tube 26 is then fitted into the plug 100 and soldered into place. The proper amount of a volatile fluid is then placed in the bellows 96 and tube 26 through the openings 112 and 114. The upper end of the opening 112 is then closed off by screwing the plug 116 into the upper end of the connecting member 90. The plug 116 is then soldered into place to make a perfect seal for the volatile fluid. The plug 100 is secured to the large nut 102 by means of the nut 104. The valve 86 which has been previously soldered to the thermostatic disc 88 is slipped over the upper projection of the connecting member 90. The screen 117 is slipped up through the opening in the casing 24 after which the large nut 102 is screwed into the casing 24. The bellows 124 is soldered to the lower end of the sleeve 126 and also to the flange 122 of the cup member 118. The bellows 124 and collar 126 are then placed inside the casing 24 as shown in Fig. 2, and the nut 92 is screwed down on the upper projection of the connecting member 90 to clamp the thermostatic disc 88 securely in place. The plug 120 is then screwed into the member 118 to hold the cup member 118 securely against the nut 92. The spring 144 is then placed inside sleeve 126 and bellows 124. The nut 136 and the threaded stud 138 which have previously been assembled on the pin 140 by means of the collars 142, are then placed in position as shown in Fig. 2. The nut 130 is then screwed onto the casing 24 to clamp the flange 128 of the sleeve 126 securely against the casing 24. This nut 130 also holds the nut 136 and the stud 138 in position. The cup 152 is then placed over the upper portion of the nut 130 and the handle 28 secured to the pin 140 by means of the screw 146.

*Operation*

The boiler 10 is arranged to maintain a constant relatively high steam pressure during one period of time and a constant relatively low steam pressure during another period of time by proper manipulation of switch 44. It will be assumed that the boiler is used to heat a building in which it is desired to maintain a normal relatively high space temperature during the day and a relatively low space temperature during the night. The steam for the radiators passes up through the riser 16 and enters the thermostatic radiator valves 22 through the pipes 30. The steam enters the inlet chamber 70 through the opening 76 and then passes through the opening 82 into the chamber 72 which is connected with the radiator by means of the opening 80. By turning the handle 28, the valve 86 can be made to assume any desired position for a particular temperature of the air surrounding the lower end of the tube 26. The valve 86 will then be moving up and down automatically in accordance with the temperature of the air surrounding the lower end of the tube 26 to maintain a constant space temperature. At the close of the day when the switch 44 is shifted to the night position, the boiler pressure decreases to a lower value which is then automatically maintained constant by means of a pressure switch 36. This decrease in steam pressure will cause the radiators to cool as a result of the decrease in the fluid temperature and the decrease in fluid circulation, and this will in turn allow the space to cool. When this occurs, the bellows 96 will contract and thereby tend to move the valve 86 to a wider open position to admit more of this low-temperature steam to the radiators but, since the valve 86 is supported upon a thermostatic disc 88 which responds to some physical condition of the passing fluid such as temperature, it will automatically and immediately tend to move the valve 86 to a more nearly closed position and thus maintain the space temperature at a relatively low value during the night. When the switch 44 is shifted back to the day position, the boiler pressure will increase to a normal relatively high value and will then be maintained constant at that value by means of the pressure switch 38. This increased steam pressure will increase the radiator temperature as a result of the increase in the fluid temperature and the increased circulation. As the space warms up, the bellows 96 will expand and tend to move the valve 86 to a more nearly closed position but the thermostatic disc 88 will tend to move the valve 86 to a wider open position, and as a result the space temperature will be maintained at a relatively high value during the day. In this way, the thermostatic disc 88 additionally adjusts the position of the valve 86 which causes the space temperature to be maintained at different temperature values for the different periods of time during which the heating fluid is supplied at different heat-content values. In a valved device of this construction, the opening 82 through the partition 74 is made large in comparison with the opening in an ordinary valve of the same size. This is done to enable the maximum required fluid-flow to take place by moving the valve 86 only a few thousandths of an inch from the valve seat 84. By this arrangement the valve 86 will move to vary the fluid-flow from minimum to maximum with only a small temperature change at the lower end of the tube 26, and the thermostatic disc 88 can move the valve 86 sufficiently to give the desired change in room temperature for a given change in the heat-content of the fluid even though this movement is only a few thousandths of an inch.

Figure 3:
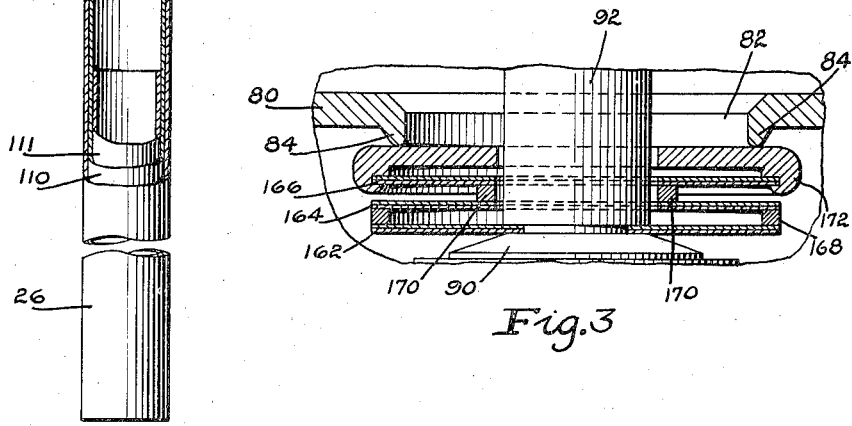
Fig. 3 is an enlarged sectional view of a modification of my improvement shown in Fig. 2.

In the modification shown in Fig. 3, corresponding parts are designated by the same numbers as in Fig. 2. In this modification, the thermostatic disc 88 and the valve 86 of Fig. 2 are replaced with a compound thermostatic valve assembly consisting of thermostatic or bimetallic elements in the form of thermostatic discs 162, 164 and 166. The thermostatic discs 162 and 164 are both soldered to a ring 168 in the outer edges. The thermostatic discs 164 and 166 are both soldered to a ring 170 at their inner edges.

A valve 172 is secured to the outside edge of the thermostatic disc 166. The valve 172 cooperates with the valve seat 84 in the same manner that valve 86 cooperates with the valve seat 84 in Fig. 2. This compound thermostatic valve assembly is clamped against a shoulder on the connecting member 90 by screwing the nut 92 down against the thermostatic disc 162. The openings in the thermostatic discs 164 and 166 are large enough to clear the nut 92. The thermostatic discs 162, 164 and 166 all have their more active sides up in order that they may function in the same manner as thermostatic disc 88 of Fig. 2. This compound thermostatic disc assembly can be used when it is desired to amplify the valve movement and thus cause greater differences in the space temperature which is being maintained for corresponding differences in the heat-content of the fluid.

Various other modifications and combinations of thermostatic elements may be used to replace the thermostatic disc 88. Volatile-filled bellows, as well as devices responsive to the pressure of the steam passing through the valve, may also be used to accomplish the same result, provided they are arranged to move the valve in the proper direction upon changes in the heat-content of the fluid.

This invention may be applied to various types of systems and will find utility in the heating, refrigeration, processing and manufacturing fields, and it is to be understood that various modifications thereof will be apparent to those skilled in the art without departing from the spirit and scope of the invention set forth in the following claims.

Having thus described my invention, what I claim as new and desire to secure by United States Letters Patent is:

1. A heating system comprising, a radiator for heating a space, means for supplying a heated fluid at a constant relatively high heat-content value during one period of time and at a constant relatively low heat-content value during another period of time, thermostatic means responsive to the temperature of the space for regulating the amount of the fluid entering the radiator to maintain a constant space temperature, and means responsive to a physical condition of the fluid for additionally regulating the amount of the fluid entering the radiator whereby different space temperatures are maintained corresponding to the different fluid heat-content values.

2. A heating system comprising, a radiator for heating a space, means for supplying a heated fluid at a constant relatively high heat-content value during one period of time and at a constant relatively low heat-content value during another period of time, thermostatic means responsive to the temperature of the space for regulating the amount of the fluid entering the radiator to maintain a constant space temperature, and means responsive to a physical condition of the fluid for adjusting the thermostatic means whereby different space temperatures are maintained corresponding to the different fluid heat-content values.

3. A heating system comprising, a radiator for heating a space, means for supplying a heated fluid at a constant relatively high heat-content value during one period of time and at a constant relatively low heat-content value during another period of time, a thermostatic valve responsive to the temperature of the space for regulating the amount of the fluid entering the radiator to maintain a constant space temperature, and means responsive to the heat-content of the fluid for adjusting the thermostatic valve whereby different space temperatures are maintained corresponding to the different fluid heat-content values.

4. A heating system comprising, a plurality of radiators for heating a space, means for supplying a heated fluid at a constant relatively high heat-content value during one period of time and at a constant relatively low heat-content value during another period of time, a plurality of thermostatically controlled valves responsive to the temperature of the space for regulating the amount of the fluid entering the radiators to maintain a constant space temperature, and means responsive to a physical condition of the fluid for additionally regulating the amount of fluid entering the radiators whereby different space temperatures are maintained corresponding to the different fluid heat-content values.

5. A heating system comprising, a radiator for heating a space, means for supplying a heated fluid at a constant relatively high temperature during one period of time and at a constant relatively low temperature during another period of time, thermostatically controlled means responsive to the temperature of the space for regulating the amount of the heated fluid entering the radiator to maintain a constant space temperature, and means responsive to the temperature of the fluid for additionally regulating the amount of fluid entering the radiator whereby different space temperatures are maintained during the different periods of time.

6. A heating system comprising, a plurality of radiators for heating a space, means for supplying a heated fluid at a constant relatively high temperature during one period of time and at a constant relatively low temperature during another period of time, a plurality of thermostatic valves responsive to the temperature of the space for regulating the amount of the heated fluid entering the radiators to maintain a constant space temperature, and thermostatic means responsive to the temperature of the fluid for adjusting the thermostatic valves whereby different space temperatures are maintained during the different periods of time.

7. A heating system comprising, a radiator for heating a space, means for supplying steam at a constant relatively high pressure during one period of time and at a constant relatively low pressure during another period of time, thermostatic means responsive to the temperature of the space for regulating the amount of steam entering the radiator to maintain a constant space temperature, and means responsive to a physical condition of the steam for additionally regulating the amount of steam entering the radiator whereby a constant relatively high space temperature is maintained during the one period of time and a constant relatively low space temperature is maintained during the other period of time.

8. A heating system comprising, a radiator for heating a space, means for supplying steam at a constant relatively high pressure during one period of time and at a constant relatively low pressure during another period of time, a thermostatic valve responsive to the temperature of the space for regulating the amount of the steam entering the radiator to maintain a constant space temperature, and thermostatic means responsive to the temperature of the steam for adjusting the thermostatic valve whereby a constant relatively high space temperature is maintained during the one period of time and a constant relatively low space temperature is maintained during the other period of time.

9. A valved device comprising, a casing having inlet and outlet openings for a heating fluid, thermostatic means for regulating the amount of fluid passing through the casing in accordance with the heat requirements, and means responsive to a physical condition of the fluid for decreasing the fluid-flow upon a decrease in the heat-content of the fluid and vice versa.

10. A valved device comprising, a casing having inlet and outlet openings for a heating fluid, thermostatic means for regulating the amount of fluid passing through the casing in accordance with the heat requirements, and means responsive to a physical condition of the fluid for adjusting the thermostatic means to decrease the fluid-flow upon a decrease in the heat-content of the fluid and vice versa.

11. A valved device comprising, a casing having fluid inlet and outlet openings, a valve in the casing to regulate the amount of fluid passing through the casing, thermostatically controlled means responsive to a temperature condition outside the casing for varying the position of the valve, manually operable adjusting means for the temperature-condition-responsive means, and means responsive to a physical condition of the fluid to decrease the fluid-flow upon a decrease in the heat-content of the fluid and vice versa.

12. A valved device comprising, a casing having fluid inlet and outlet openings, a valve in the casing to regulate the amount of fluid passing through the casing, thermostatic means responsive to a temperature condition outside the casing for varying the position of the valve, manually operable adjusting means for the temperature-condition-responsive means, and thermostatic means responsive to the temperature of the fluid to move the valve toward closed position upon a decrease in the heat-content of the fluid and vice versa.

13. A valved device comprising, a casing having fluid inlet and outlet chambers, a partition separating the chambers and having an opening therein for the passage of a fluid between the chambers, a valve in the inlet chamber and cooperating with the partition to regulate the flow of a fluid through the opening, an actuator for the valve, thermostatic means external of the casing for operating the actuator to regulate said fluid-flow, manual means external of the casing for operating the valve and for adjusting the thermostatic means, and a second thermostatic means in the inlet chamber to increase the valve-opening upon an increase of fluid-temperature and vice versa.

14. A valved device comprising, a casing having inlet and outlet openings for a heating fluid, means for regulating the amount of fluid passing through the casing, and means responsive to a physical condition of the fluid for decreasing the fluid flow upon a decrease in the heat content of the fluid and vice versa.

GEORGE D. KINGSLAND.